US012811883B2

(12) United States Patent
Prasad et al.

(10) Patent No.: US 12,811,883 B2
(45) Date of Patent: Nov. 24, 2026

(54) NETWORK ON CHIP CONSTRUCTION THROUGH MULTI-INSTANCING

(71) Applicant: Baya Systems, Inc., Santa Clara, CA (US)

(72) Inventors: Honnahuggi Harinath Venkata Naga Ambica Prasad, Bengaluru (IN); Narayana Sri Harsha Gade, Bangalore (IN); Eric Norige, Santa Clara, CA (US)

(73) Assignee: BAYA SYSTEMS, INC., Santa Clara, CA (US)

( * ) Notice: Subject to any disclaimer, the term of this patent is extended or adjusted under 35 U.S.C. 154(b) by 0 days.

(21) Appl. No.: 18/806,046

(22) Filed: Aug. 15, 2024

(65) Prior Publication Data

US 2026/0012422 A1 Jan. 8, 2026

(30) Foreign Application Priority Data

Jul. 2, 2024 (IN) ............................. 202411050661

(51) Int. Cl.

| | |
|---|---|
| ***H04L 47/125*** | (2022.01) |
| ***H04L 12/44*** | (2006.01) |
| ***H04L 41/12*** | (2022.01) |
| ***H04L 45/586*** | (2022.01) |
| ***H04L 49/109*** | (2022.01) |

(52) U.S. Cl.
CPC ............ *H04L 47/125* (2013.01); *H04L 12/44* (2013.01); *H04L 41/12* (2013.01); *H04L 45/586* (2013.01); *H04L 49/109* (2013.01)

(58) Field of Classification Search
CPC ..... H04L 49/109; H04L 47/125; H04L 41/12; H04L 45/586
USPC .......................................................... 709/238
See application file for complete search history.

(56) References Cited

U.S. PATENT DOCUMENTS

| | | | | |
|---|---|---|---|---|
| 2017/0220499 | A1* | 8/2017 | Gray | G06F 13/36 |
| 2017/0228481 | A1* | 8/2017 | Pusuluri | G06F 30/392 |
| 2020/0234396 | A1* | 7/2020 | Qi | G06F 12/0207 |
| 2025/0168053 | A1* | 5/2025 | Triplet | H04L 41/0654 |
| 2025/0174294 | A1* | 5/2025 | Van Ruymbeke | G11C 29/44 |
| 2025/0300930 | A1* | 9/2025 | Boucard | G06F 13/4022 |
| 2025/0390648 | A1* | 12/2025 | Fernandez | G06F 30/31 |

FOREIGN PATENT DOCUMENTS

| | | | | |
|---|---|---|---|---|
| CN | 111597141 A | * 8/2020 | | H04L 69/08 |
| CN | 111935035 A | * 11/2020 | | H04L 45/16 |

* cited by examiner

*Primary Examiner* — Lan Dai T Truong
(74) *Attorney, Agent, or Firm* — Procopio, Cory, Hargreaves & Savitch LLP

(57) ABSTRACT

Apparatus and methods for constructing Network on Chips (NoCs) by algorithmically elaborating one or more of Network on Chips (NoCs) through a hierarchical topology composed of instantiations of sub-NoCs and leaf components, and one or more connectivity definitions. Designing NoCs using one or more instantiations of sub-NoCs reduces overheads during chip backend processes, such as for timing closure.

15 Claims, 11 Drawing Sheets

100A

100B

NETWORK ON CHIP CONSTRUCTION THROUGH MULTI-INSTANCING

BACKGROUND

This application claims priority to IN 202411050661, filed on Jul. 2, 2024, the contents of which are incorporated herein by reference.

Technical Field

Methods and example embodiments described herein are generally directed to constructing Network on Chips (NoCs), and more specifically, to constructing NoCs designs using multi-instancing of sub-NoCs and leaf components and algorithmically elaborating sub-NoCs or leaf components within the NoCs.

Related Art

The number of components on a chip is rapidly growing due to increasing levels of integration, system complexity, and shrinking transistor geometry. Complex System-on-Chips (SoCs) may involve a variety of components e.g., processor cores, digital signal processors (DSPs), hardware accelerators, memory, and I/O, while Chip Multi-Processors (CMPs) may involve a large number of homogenous processor cores, memory and Input/Output (I/O) subsystems. In both systems, the on-chip interconnect plays a key role in providing high-performance communication between the various components. Due to scalability limitations of traditional buses and crossbar-based interconnects, Network-on-Chip (NoC) has emerged as a paradigm to interconnect a large number of components on the chip.

NoC is a global shared communication infrastructure made up of several routing nodes interconnected with each other using point-to-point physical links. Messages are injected by the source and are routed from the source node/router to the destination node/router over multiple intermediate nodes and physical links. The destination node/router then ejects the message and provides it to the destination. For the remainder of the document, terms 'processing elements,' 'components,' 'blocks,' 'hosts,' or 'cores,' will be used interchangeably to refer to the various system components which are interconnected using a NoC. Without loss of generalization, the system with multiple interconnected components will itself be referred to as a 'multi-core system'.

There are several possible topologies in which the routers can connect to one another to create the system network. Bi-directional rings 100A (as shown in FIG. 1A) and 2-D mesh 100B (as shown in FIG. 1B) are examples of topologies in the related art.

Packets are message transport units for intercommunication between various components. Routing involves identifying a path which is a set of routers and physical links of the network over which packets are sent from a source to a destination. Components are connected to one or multiple ports of one or multiple routers; with each such port having a unique identifier (ID). Packets carry the destination's router and port ID for use by the intermediate routers to route the packet to the destination component.

Examples of routing techniques include deterministic routing, which involves choosing the same path from A to B for every packet. This form of routing is oblivious to the state of the network and does not load balance across path diversities which may exist in the underlying network.

However, such deterministic routing may be simple to implement in hardware, maintains packet ordering, and may be easy to make free of network-level deadlocks. Shortest path routing minimizes the latency as it reduces the number of hops from the source to the destination. For this reason, the shortest path is also the lowest power path for communication between the two components. Dimension-order routing is a form of deterministic shortest-path routing in 2D mesh networks.

FIG. 2 illustrates an example of XY routing in a two-dimensional mesh 200. More specifically, FIG. 2 illustrates XY routing from node '34' to node '00'. In the example of FIG. 2, each component is connected to only one port of one router. A packet is first routed in the X dimension till the packet reaches node '04' where the x dimension is same as the destination. The packet is next routed in the Y dimension until the packet reaches the destination node.

Source routing and routing using tables are other routing options used in NoC. Adaptive routing can dynamically change the path taken between two points on the network based on the state of the network. This form of routing may be complex to analyze and implement and is therefore rarely used in practice.

A NoC may contain multiple physical networks. Over each physical network, there may exist multiple virtual networks, where different message types are transmitted over different virtual networks. In this case, at each physical link or channel, there are multiple virtual channels, each virtual channel may have dedicated buffers at both end points. In any given clock cycle, only one virtual channel can transmit data on the physical channel.

NoC interconnects often employ wormhole routing, where a large message or packet is broken into small pieces known as flits (also referred to as flow control digits). The first flit is the header flit which holds information about the packet's route and key message level information along with payload data and sets up the routing behavior for all subsequent flits associated with the message. Zero or more body flits follow the head flit, containing the remaining payload of data. The final flit is a tail flit which in addition to containing the last payload also performs some bookkeeping to close the connection for the message. In wormhole flow control, virtual channels are often implemented.

The physical channels are time-sliced into a number of independent logical channels called virtual channels (VCs). VCs provide multiple independent paths to route packets; however, they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" refers to the way messages are transmitted over the channels: the output port at the next router can be so short that received data can be translated in the head flit before the full message arrives. This allows the router to quickly set up the route upon arrival of the head flit and then opt-out from the rest of the conversation. Since a message is transmitted flit by flit, the message may occupy several flit buffers along its path at different routers, creating a worm-like image.

Based on the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies. However, all channels are equal in width or number of physical wires. This width can be determined based on the most loaded channel and the clock frequency of various channels.

SUMMARY

Aspects of the example implementations may include a method that includes algorithmically elaborating one or more of Network on Chips (NoCs) through a hierarchical topology composed of instantiations of sub-NoCs and leaf components, and one or more connectivity definitions.

Additional aspects of the example implementations may further include a computer-readable storage medium storing instructions for executing a process, the instructions include algorithmically elaborating one or more of Network on Chips (NoCs) through a hierarchical topology composed of instantiations of sub-NoCs and leaf components, and one or more connectivity definitions.

Additional aspects of the example implementations may further include an apparatus including a control module configured to algorithmically elaborate one or more of Network on Chips (NoCs) through a hierarchical topology composed of instantiations of sub-NoCs and leaf components, and one or more connectivity definitions.

DETAILED DESCRIPTION

Figure 1A:
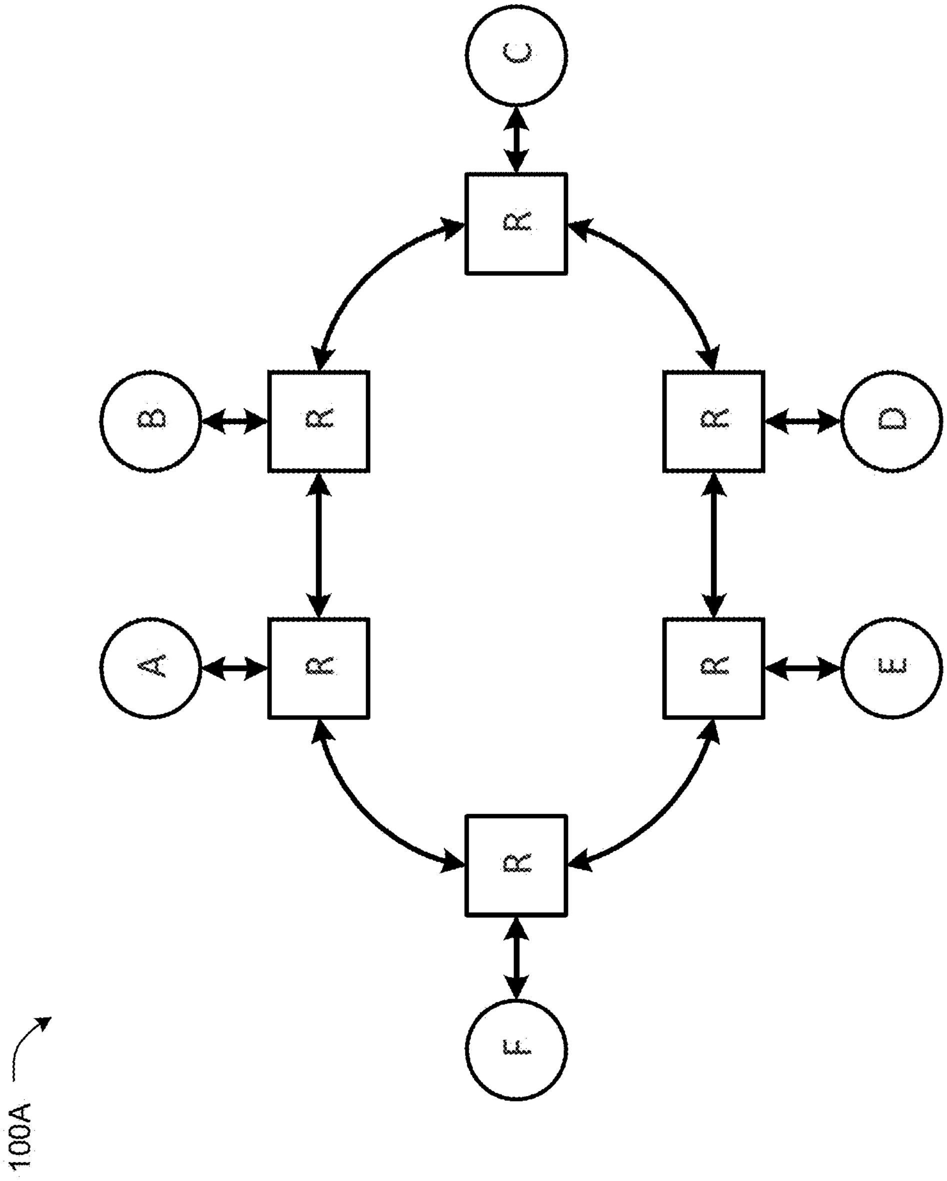
FIGS. 1A and 1B illustrate examples of Bidirectional ring and 2D Mesh Network on Chip (NoC) topologies.
Figure 1B:
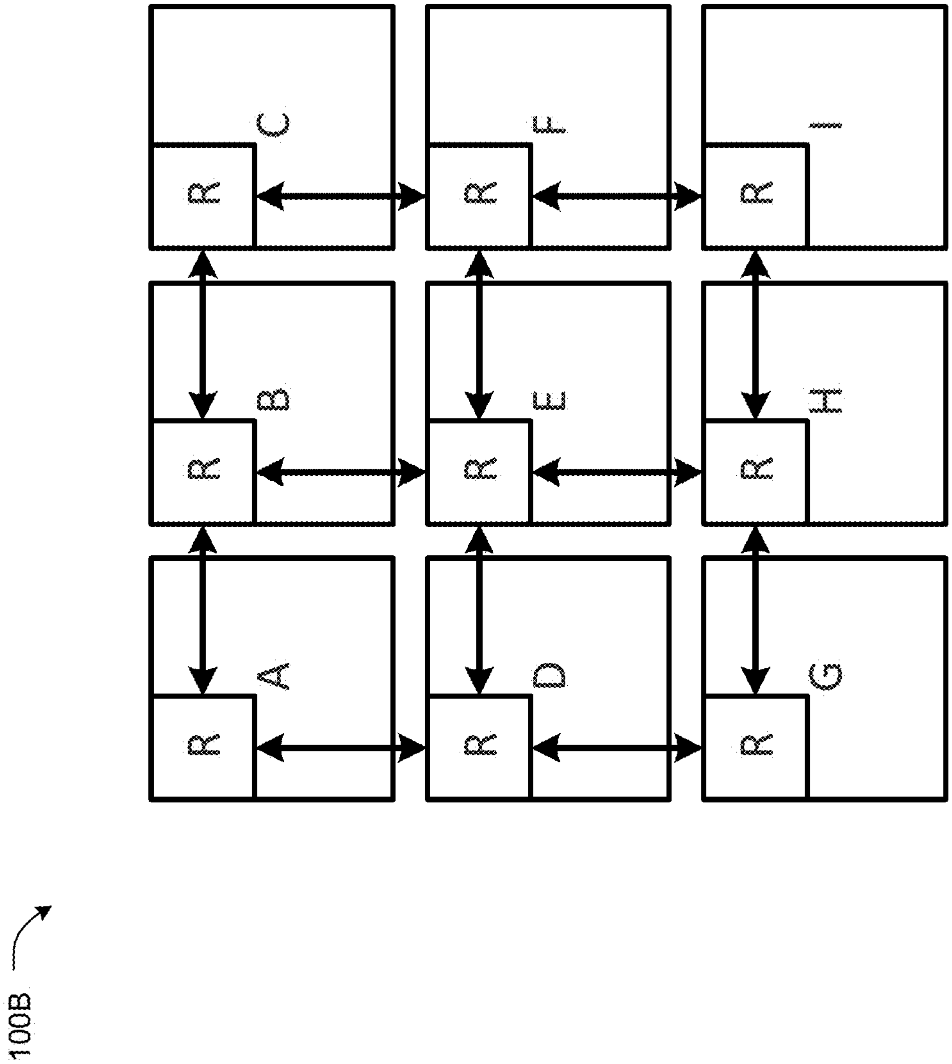
Figure 2:
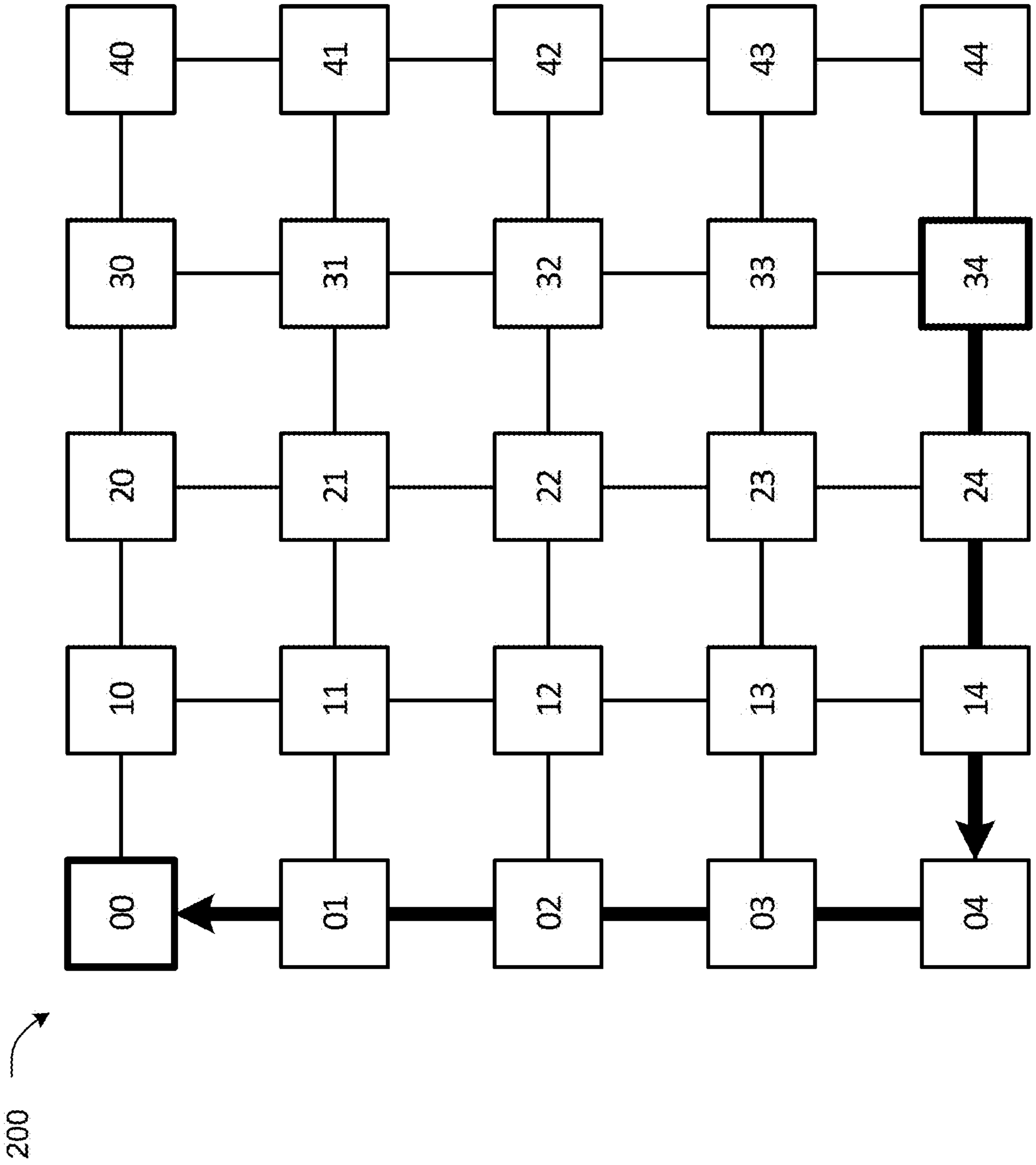
FIG. 2 illustrates an example of XY routing in a NoC having a two-dimensional mesh topology.

Example embodiments described herein are directed towards constructing Network on Chips (NoCs) using one or more instantiations of sub-components/sub-NoCs represented in a structured hierarchical topology.

Multi-instancing of NoC/sub-NoCs is a desirable feature from the perspective of optimizing chip backend processes/physical design processes, such as for reducing the effort of required for timing closure. However, the existing solutions only allow users/designers to fabricate NoCs/sub-NoCs in a flat topology. Further, most solutions allow the NoCs/sub-NoCs to be constructed in a top-down approach (i.e. defining a top-level design/architecture of the NoC, and then elaborating type of components, number of wires, number of ports, etc., between the components). This prevents designers from elaborating and building NoCs/sub-NoCs with a bottom-up approach, that is defining pieces/sub-NoCs of a system and then building the system out of those pieces. When doing this, one must check for compatibility between all NoC/sub-NoCs being assembled. The bottom-up approach may enable designers to build NoCs through multi-instancing of sub-NoCs or other leaf components, which may reduce the complexity and overheads/effort required to perform chip backend processes before fabrication.

Unlike related art systems, the method disclosure herein includes algorithmically elaborating one or more NoCs through a hierarchical topology including one or more instantiations of sub-NoCs and leaf components, and one or more connectivity definitions.

The present disclosure also provides an apparatus configured to implement the method to construct NoCs. In an embodiment, the method/apparatus may define NoCs through the hierarchical topology, which may involve creating a multi-layered hierarchical structure for sub-NoCs to be implemented within a single chip or one or more chiplets, or a combination thereof. For instance, a processor with multiple cores may have or be associated with one or more sub-NoCs for internal data communication. These sub-NoCs (or designs thereof) may be interconnected through a higher-level NoC topology, thereby creating a hierarchical NoC structure (e.g., hierarchical topology). In an embodiment, interconnect fabrics/NoCs of integrated circuits may be designed by focusing on aspects such as, but not limited to, multi-instancing and chipset awareness. Multi-instancing may allow for the replication of NoC components (such as sub-NoCs) to efficiently construct NoC topologies for handling various tasks or workloads, thereby enhancing scalability and resource utilization. The chipset awareness may enhance communication with modular chipset components, thereby enabling a fabric to adapt to various chip configurations and integration scenarios. By incorporating chipset awareness and multi-instancing into the interconnect fabric specification, designers may create adaptable communication infrastructures.

NoCs can be constructed/defined by creating designs/design patterns of sub-NoCs and leaf components. The designs/design patterns correspond to topologies or arrangements of leaf/NOC components (such as routers, bridges, links, and the like), and connectivity definitions thereof. Further, each design/design pattern may implement other smaller designs arranged in a hierarchy, which may be represented by a directed acyclic graph.

In an embodiment, the hierarchical topology may be partially captured in a directed- acyclic graph with designs/design patterns as vertices/nodes and instantiations of these designs as edges from a parent design to an instantiated child design. The graph being acyclic implies that each design in the graph has a hierarchical structure. Root nodes of the directed-acyclic graph may correspond to top-level designs that assemble other sub-NoCs to capture the complete interconnect definition. Root nodes have no incoming edges, as they are not instantiated as part of the other nodes. The topmost layer of the NoC hierarchy can include multiple root nodes, each corresponding to a variant of the product/system (or a System on Chip, for example) on which NoCs are to be implemented, such as products having different numbers of core clusters or products including/excluding specialized processing units. Leaf components are the nodes at the end of the directed-acyclic graph, i.e. those nodes/routers having incoming edges, but no outgoing edges. The leaf components, being any one of routers, bridges, and the like, but not limited thereto, may correspond to NoC components. Examples of NoCs having multiple sub-NoCs arranged in a hierarchical topology represented in a directed acyclic graph are illustrated and described subsequently in reference to FIGS. 3A-3F.

In some embodiments, the sub-NoCs and the leaf components are pre-elaborated. In such embodiments, the sub-NoCs and the leaf node components may have at least one path (indicated by wires, links, or virtual channels) for allowing traffic flow within the sub-NoC, and between said sub-NoCs and said leaf node components as defined in traffic specification. For example, each sub-NoC may include associated NoC components such as, but not limited to routers, switches, links, and the like, that may be designed and optimized in advance for specific functionalities and traffic patterns. In some examples, the sub-NoC of the cores dedicated to graphics processing may be pre-configured to handle high-bandwidth data transfers for graphic workloads, while the sub-NoC in a computational core may be optimized for low-latency operations. Similarly, the leaf components (such as routers) connected to individual processing units, or memory blocks associated with each core, are pre-configured to manage distinct types of data packet. The design of the sub-NoC may be defined or elaborated using a Hardware Definition Language (HDL), which may be further convertible into other data structures (such as register transfer level (RTL) descriptions and gate-level netlists) during physical design processes/chip backend processes. Multi-instancing allows such designs to be instantiated/reused multiple times to construct larger and more comprehensive designs. The ability to reuse pre-elaborated components allows NoC components from a past generation of product to be included in the next generation, for example.

The NoCs may be algorithmically elaborated using the hierarchical topology and one or more connectivity definitions. The connectivity definitions may correspond to configurations associated with ingress and egress ports of NoC components/leaf components associated with the sub-NoCs, and protocol information (such as size and structure of packets being transported therethrough, among others). The connectivity definitions are indicative of the transport connectivity definitions providing paths that different packets take along the NoC. The NoCs may be elaborated by configuring/modifying each NoC component to support the packets to be transported therethrough. The elaboration process may include configuring internal designs of the NoC components based on internal hops (i.e. movement of packets from ingress ports to egress ports of the NoC components) and protocol information. The elaboration process may yield an interconnect design representing the top-level NoC.

In some embodiments, for algorithmically elaborating (or generating the mappings for elaboration thereof) the sub-NoCs and the leaf components, traffic specifications associated with the sub-NoC may be combined with the hierarchical topology. In an embodiment, a path may be determined/mapped for each flow in the traffic specifications. The mappings may be determined using techniques known in the art. Determining the path may include routing/identifying routes for data packets through the most efficient paths within the hierarchical NoC structure (e.g., the hierarchical topology). For each path, each component or wire in the path may be configured to carry a specific type of packet for a flow from a prior component of the path to a next component in the path. The traffic specifications may include information such as, but not limited to, traffic flows, bandwidth allocation for data packets, a Quality of Service (QoS), priority levels for various data packets, transmitting time period of data packets, and the like. For example, in a multicore processor, a subset of cores may be connected by the sub-NoC, and these sub-NoCs are further connected by the higher-level sub-NoC. When a data packet needs to be transferred from core A to core B, an optimal path through the NoCs may be determined/mapped by considering factors such as, but not limited to congestion, distance, and the like. This path may involve traversing the data packet through local sub-NoCs associated with core A, moving to the higher-level NoC components, and then transferring through the sub-NoC associated with Core B. In an embodiment, each NoC component or the wire along this path may be configured to handle/support a specific type of data packet or format of data packet transmitted between each source component and a destination component in the path. The path may also include the virtual channel information. Additionally, combining the traffic specifications with the hierarchical topology may involve algorithmically optimizing these paths and configurations, thereby adapting to different data flows and traffic patterns.

In an embodiment, the paths of packets through each sub-NoC (or design thereof) may include information of virtual channels. These virtual channels may provide independent flow control signals within the same physical link or connection. For example, in high priority control signals may be segregated from bulk data transfers through virtual channels so that one can make progress even if the other is stalled. When the elaboration process acts on such paths, it will need to configure the NoC component designs to support this separate handling. The channel information, along with the hierarchical topology and the connectivity definitions, may be used for checking compatibility between sub-NoCs of a NoC design. Without this tracking/checks, incompatible components may be connected in a parent design, resulting in a non-functional system.

The traffic specification may also include information on transmitting data packets of different types between the sub-NoCs. In an embodiment, various categories of data packets may carry different types of information. The categories may include display traffic, main memory reads and writes, peer-to-peer (P2P) Input/Output (IO) traffic, device access, and the like, for example. The display traffic category may include the data packets that are associated with video displays. Such packets have real-time deadlines to meet synchronization with video controllers, ensuring seamless visual output without latency. The main memory reads and writes category may represent a substantial volume of the NoC traffic across numerous systems. The P2P IO traffic may be related to data transmission from a source in one peripheral component interconnect (PCI) network to another destination within a separate PCI network. This data exchange may take place over the main interconnect fabric. P2P IO traffic management may involve maintaining specific ordering requirements to preserve data integrity. The device access category of packets may include request packets from Central Processing Units (CPUs) directed to various devices within the system. Such requests activate functions or operations within these devices. The architecture of the network is also taken into consideration for optimization of data flow through traffic prioritization. In some embodiments, the traffic prioritization algorithms may allow for differentiating between the urgency and bandwidth requirements of various data packets. For instance, algorithms may be tailored to provide higher priority to display traffic and main memory access, which are critical for real-time operations and system stability. Conversely, the P2P IO traffic and device access requests may follow a different priority protocol due to their distinct nature.

In an embodiment, the traffic specifications may also include information defining whether virtual channels or physical channels of the NoCs can be shared or not shared with other ones of the traffic flows. For example, the NoC has three traffic such as flow A, flow B, and flow C. If the sub-NoC includes a first virtual channel and a second virtual channel, flow A may share the first virtual channel and the second virtual channel with other flows. Similarly, if flow B is assigned a third virtual channel, flow B may share the third virtual channel with other flows. Similarly, flow C may be assigned with a fourth virtual channel, a fifth virtual channel, and a sixth virtual channel and flow C may not share the fourth virtual channel, the fifth virtual channel, and the sixth virtual channel with other flows. In this scenario, flow A and flow B may share the allocated virtual channels with other flows, allowing multiple flows to use the same channels concurrently. Flow C may have a dedicated virtual channel, and which may not be shared with other flows. This traffic flow information may help in managing the NoC communication efficiently and balancing the sharing of resources (e.g., the virtual channels) based on the requirements and characteristics of each traffic flow between sub-NoCs. The traffic specifications associated with the NoC may be integrated with the hierarchical topology for determining the mappings and elaborating the designs to obtain the interconnect design.

Figure 3A:
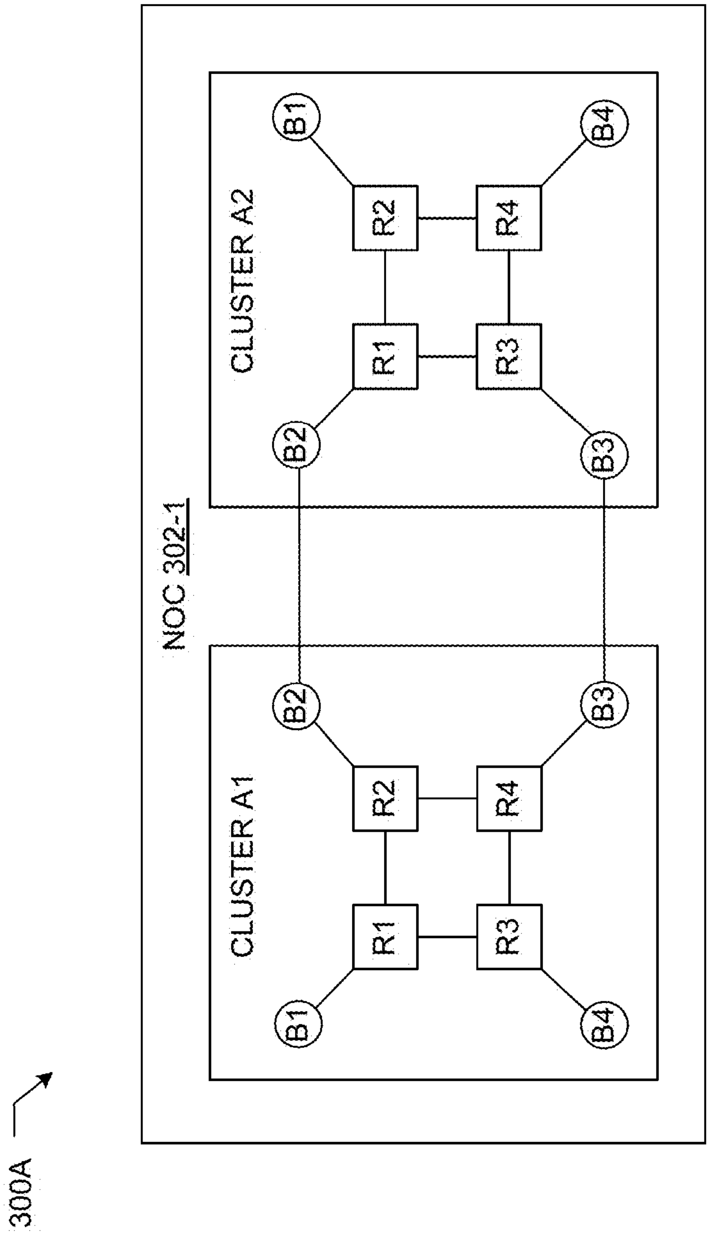
FIG. 3A illustrates a schematic representation of a sub-NoC implementing a first design pattern, in accordance with an example implementation.

Examples of NoCs constructed using the method of the present disclosure are described in detail in reference to FIGS. 3A to 3F. FIGS. 3A-3D illustrate example designs/design patterns of sub-NoCs that compose the NoCs. FIG. 3A illustrates a schematic representation 300A of sub-NoCs implementing a first design pattern, in accordance with an example implementation. The sub-NoCs shown may be implemented in or correspond to interconnects/NoC 302-1 design for a product/chiplet/system. The first design pattern may correspond to a cluster design pattern.

Referring to FIG. 3A, an example NoC featuring two instantiations of a cluster, such as cluster A1 and cluster A2, the cluster corresponding to the first design pattern. Each instance of the cluster includes four routers (R1, R2, R3, and R4) and four bridges (B1, B2, B3, and B4). In cluster designs, the boundary of the sub-NoC may include bridges, which may allow packets to be ingressed and egressed from the sub-NoC. In an embodiment, the bridges (B2 and B3) may form a bridge-to-bridge connection/links with corresponding bridges of an adjacent cluster. The inter-cluster bridge-to-bridge link may provide a pathway between the two sub-NoCs, enabling data and resources to be shared efficiently between the two clusters. Cluster designs may correspond to designs of sub-NoCs implemented in chiplets.

In some embodiments, routers (R1-R4), may route data packets between different components associated with the NoC. The routers of the clusters/sub-NoCs may forward the incoming packets to the destination through the best path therefor. In a hierarchical NoC topology, the routers may manage traffic between different sub-NoCs, thereby enhancing data transfer according to the specified paths. In an embodiment, bridges (B1-B4) may connect two separate sub-NoCs for communicating with each other. The bridges may be used to connect different sub-NoCs within the hierarchical NoC topology.

Figure 3B:
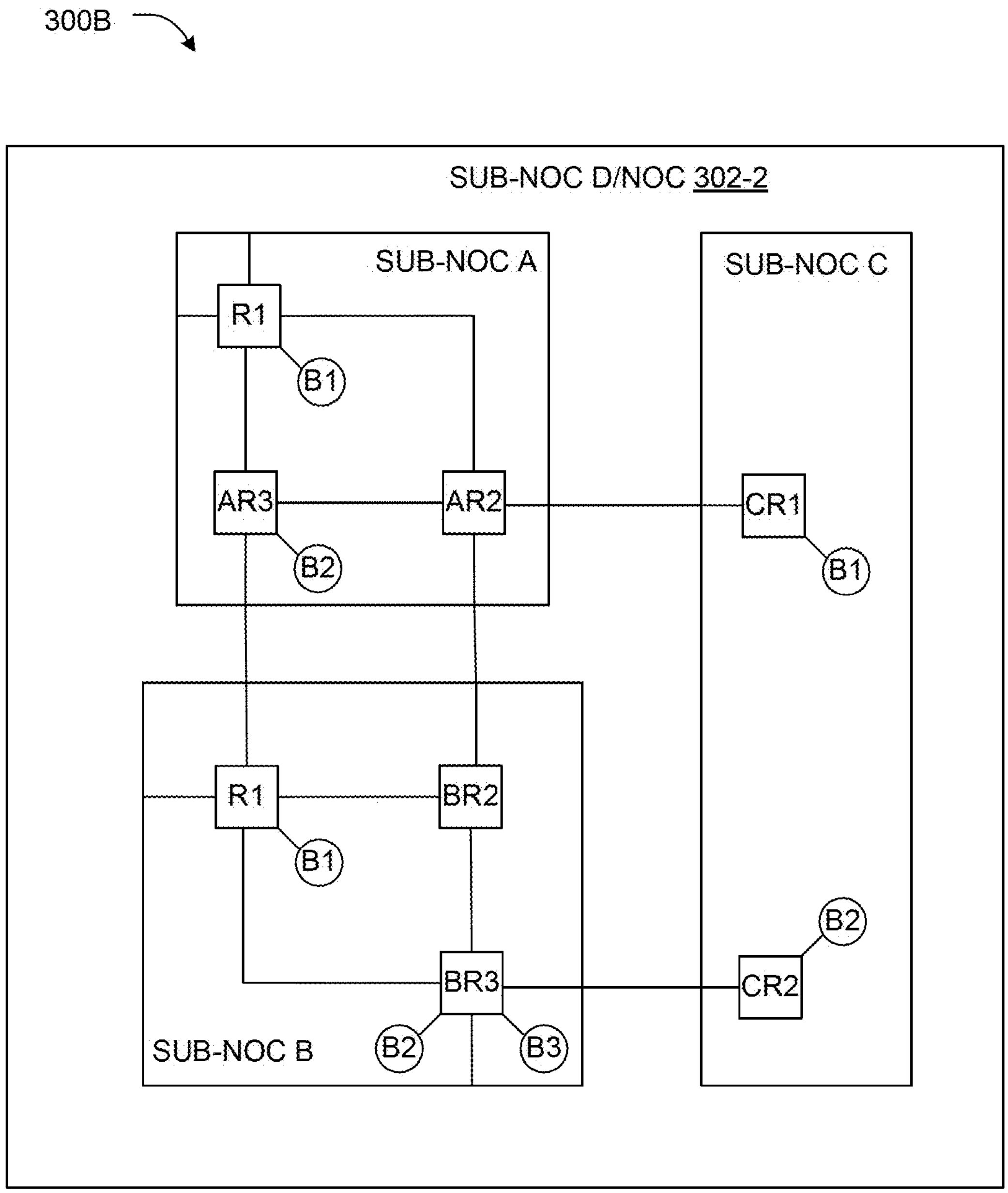
FIGS. 3B and 3C illustrate schematic representations of sub-NoCs implementing a second design pattern, in accordance with an example implementation.
Figure 3C:
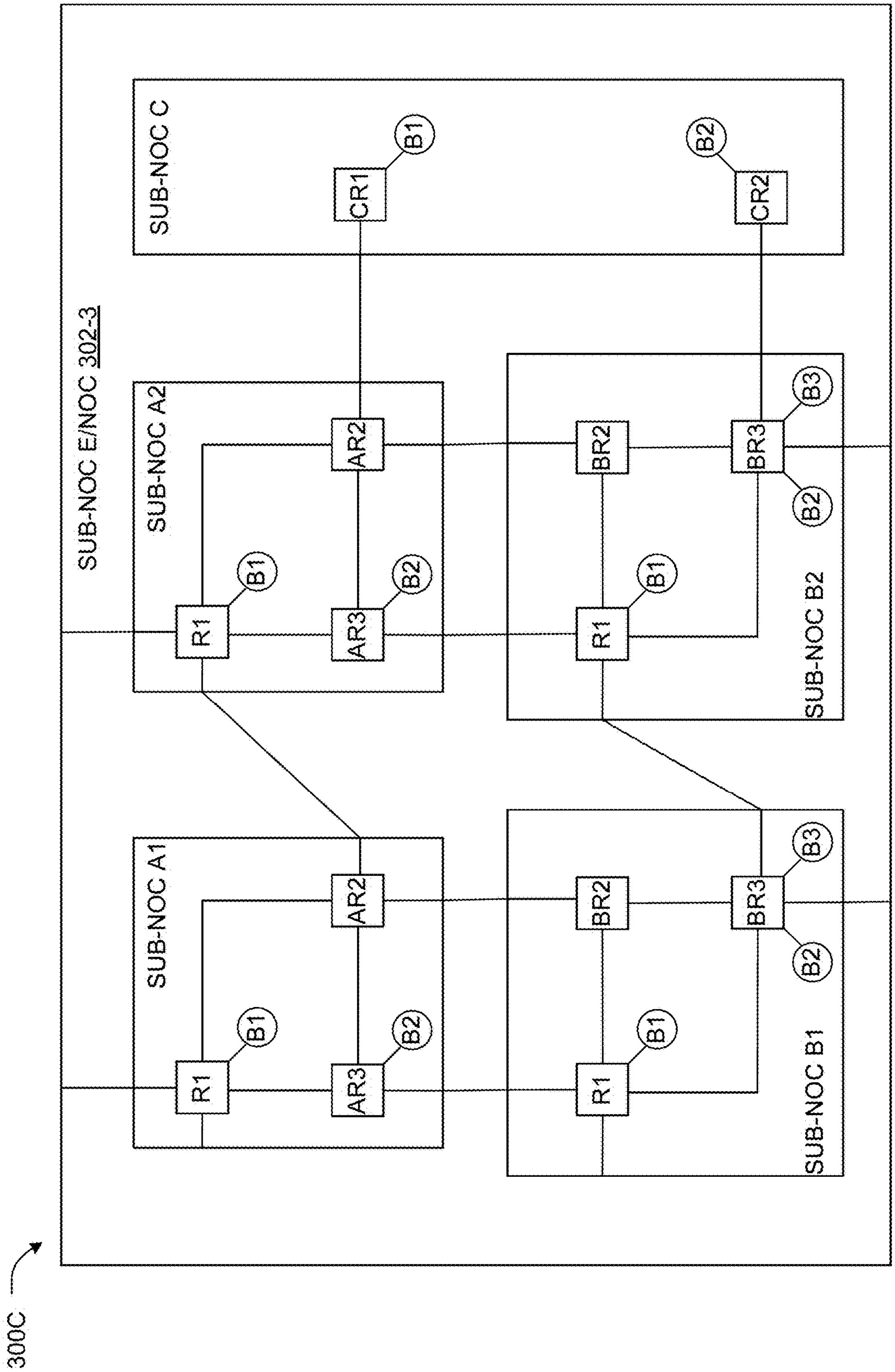

FIGS. 3B and 3C illustrate schematic representations 300B and 300C of sub-NoCs implementing a second design pattern, in accordance with an example implementation. The sub-NoCs shown may be implemented in or correspond to interconnects/NoC 302-2, 302-3 (also referred to as sub-NoCs D and E respectively) designed for a product/chiplet/system. In the second design pattern, the boundary of the sub-NoCs includes routers having their ports exposed to allow ingress and egress of packets in and out of the sub-NoC. Further, bridges connected to the routers may allow packets to be communicated with corresponding components/hosts.

Referring to FIG. 3B, three sub-NoCs are shown, viz. sub-NoC A, B, and C. Sub-NoC A includes 3 routers (R1, AR2, and AR3), and two bridges (B1 and B2 connected to R1 and AR3 respectively). The routers R1, AR2 and AR3 may be at the boundary of sub-NoC A, and may have their ports exposed to other sub-NoCs for exchanging packets. For example, router R1 has its north port and west port exposed, router AR2 has its south port and east port exposed, and router AR3 has its south port exposed to the boundary of the sub-NoC A. Similarly, sub-NoC B may have routers R1, BR2, and BR3, and bridges B1, B2, and B3. In sub-NoC B, router R1 may have its north and west port exposed, and router BR3 may have its south port and east port exposed. Finally, sub-NoC C may include routers CR1 and CR2, and bridges B1 and B2 connected to the routers CR1 and CR2 respectively. Both the routers may have their west port exposed. The sub-NoC D/NOC 302-2 may represent the connections of sub-NoCs implemented for system/product Px.a shown subsequently in FIG. 3D. Further, FIG. 3C shows sub-NoC E/NOC 302-3 having two instantiations of sub-NoC A, two instantiations of sub-NoC B, and one instance of sub-NoC C. The NoC 302-3 may represent the connections of sub-NoCs implemented for system/product Px.b shown subsequently in FIG. 3D.

Multiple instantiations of sub-NoC designs following the first and/or the second design pattern may be used to construct a top-level NoC following a third design pattern adapted for use within different products/systems.

Figure 3D:
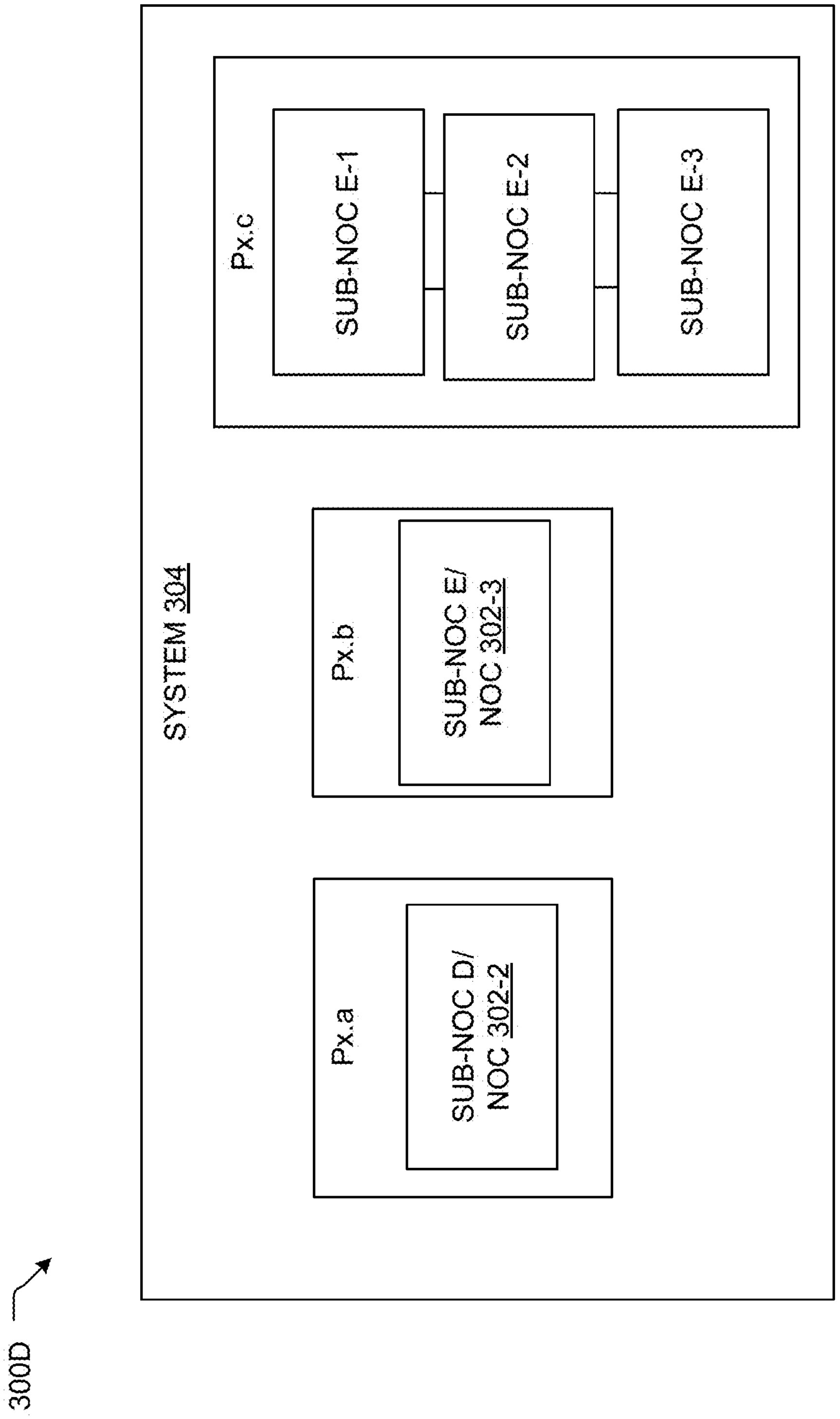
FIG. 3D illustrates a schematic representation of a sub-NoC implementing a third design pattern, in accordance with an example implementation.

FIG. 3D illustrates a schematic representation 300D of a NoC/sub-NoC implementing a third design pattern, in accordance with an example implementation. The sub-NoCs shown may be implemented in or correspond to interconnects of a product/chiplets/SoC/system 304. In the third design pattern, the boundary of the NoC/sub-NoC may not be exposed for connection with other NoC/sub-NoCs. In some embodiments, a NoC may include one or more of sub-NoCs implementing the third design pattern. The third design pattern may correspond to the top-most/highest layer of the hierarchical topology. Such design patterns may represent the product or the NoC to be implemented in a single chip or in one or more chiplets.

Referring to FIG. 3D, in some example embodiments, the system 304 may include three NoC/sub-NoC designs Px.a, Px.b, and Px.c, each including one or more instantiations of sub-NoCs D and E (as shown in FIGS. 3B and 3C). The three designs may correspond to (sub-) NoCs for a set of cores/components/chiplets associated with the system 304.

In some examples, sub-NoC A may correspond a processing unit/CPU, the sub-NoC B may be an interface for input/output operations, and the sub-NoC C may be a memory module. Each of Px.a, Px.b, and Px.c may include one or more instantiations of the sub-NoCs D and E, which in-turn include one or more instantiations of sub-NoCs A, B, and C. For example, sub-NoC D/NOC 302-2 of FIG. 3B may be indicative of Px.a having one instantiation of sub-NoCs A, B, and C each, and sub-NoC E/NOC 302-3 of FIG. 3C may be indicative of Px.b has two instantiations of sub-NoC A (viz. A1 and A2), two instantiations of sub-NoC B (viz. B1 and B2) and one instantiation of sub-NoC C. In some embodiments, a NoC associated with Px.c may include three instantiations of sub-NoC E/NOC 302-3 (viz. sub-NoC E-1, sub-NoC E-2, and sub-NOC E-3). Such duplication may be implemented for redundancy to improve fault tolerance, or it may represent parallel processing units for higher computational throughput. The ability of the Px.c node to incorporate three sub-NoCs E/NOC 302-3 mirrors a modular assembly line. Each module can work alone or as part of a more extensive system, like Px.c.

In an embodiment, the sub-NoC designs may represent a localized network within an overall hierarchical NoC topology. The sub-NoC designs may indicate internal data communication patterns and the traffic flow between the components. In the hierarchical topology, one or more instantiations of the sub-NoCs may allow communication across hierarchical layers, thereby improving scalability and manageability in the NoC.

The designs may be defined using HDL, and may be in the form of a data structure supported by the HDL. Once the leaf components and the sub-NoCs are defined, each of their instantiations may be represented using the hierarchical topology. Further, building hierarchical topologies using a bottom-up approach may allow pre-designed/pre-elaborated components of the NoC to be easily reused during construction of the NoC, while a top-down approach is restricted to generating only designs that exactly match the needs of the NoC being constructed. Using the design patterns, the hierarchical topology of the NoC to be constructed may be represented using a directed acyclic graph.

Figure 3E:
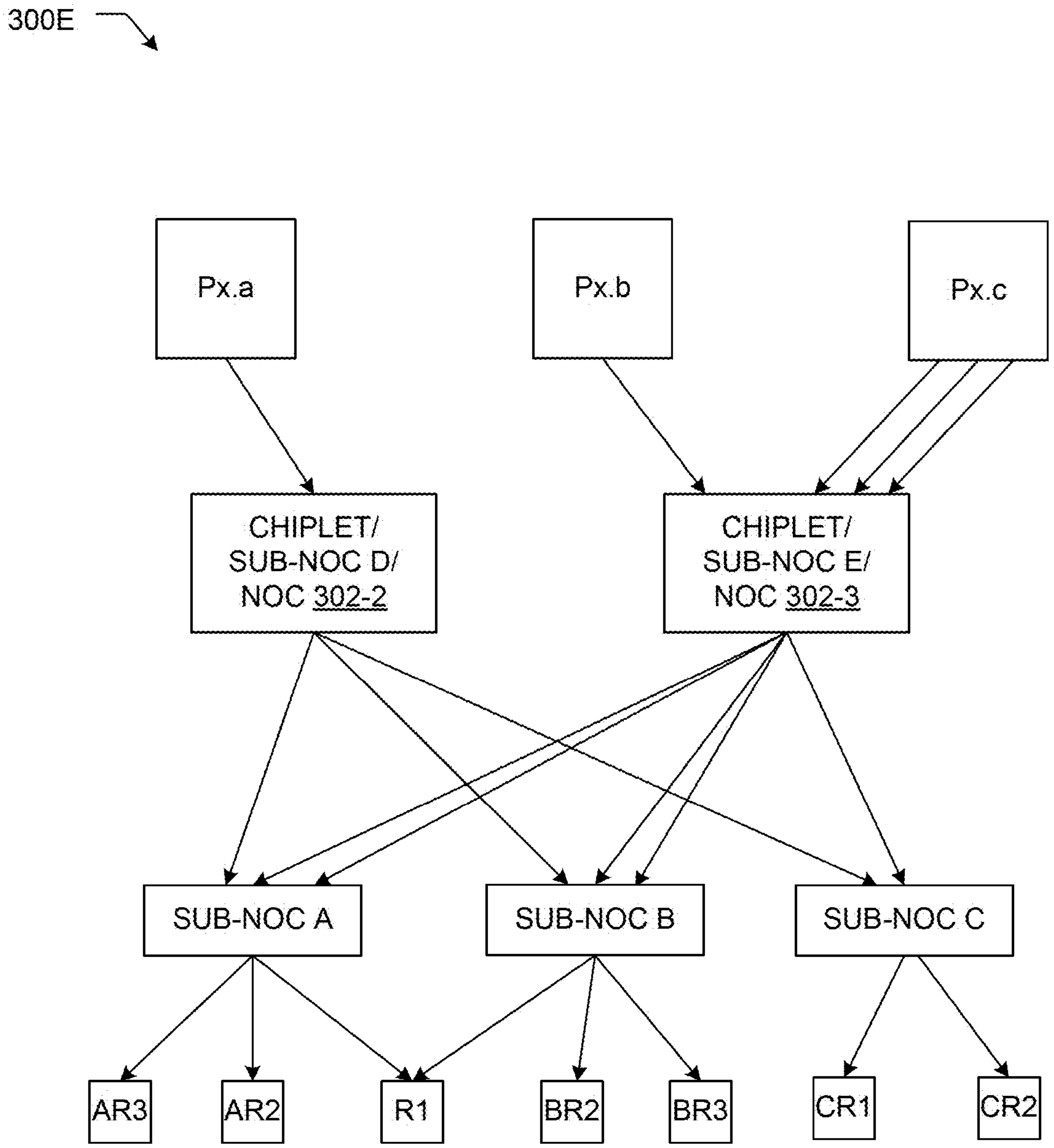
FIG. 3E illustrates an example directed acyclic graph representing the NoC, in accordance with an example implementation.

FIG. 3E illustrates an example directed acyclic graph 300E representing the NoC, in accordance with embodiments of the present disclosure. As shown, the directed acyclic graph 300D may have multiple root nodes, i.e. originating from nodes corresponding to Px.a, Px.b, and Px.c. Further, each root node may be connected to sub-NoCs A, B, C, D, and E, and leaf node components R1, AR2. AR3, BR2, BR3, CR1, and CR2. The root node corresponding to Px.a includes one edge to sub-NoC D/NoC 302-2, which in-turn has one edge each to sub-NoCs A, B, and C each, to represent the NoC topology of Px.a. The node corresponding to chiplet/sub-NoC E/NoC 302-3 includes two edges to sub-NoC A, two edges to sub-NoC B to represent two instantiations thereof, and one edge to sub-NoC C to represent one instantiation thereof in sub-NoC E/NoC 302-3. Further, sub-NoC A may have an edge each to routers/NoC-components R1, AR2, and AR3, sub-NoC B may have one edge each to NoC-components R1, BR2, and BR3, and sub-NoC C may include an edge each to NoC-component CR1, and CR2. The sub-NoCs A and B may share the design of router R1, since both sub-NoCs have a router with 4 directional ports, and one bridge. The root nodes corresponding to Px.b and Px.c may have one edge and three edges to sub-NoC E/NoC 302-3 to represent the NoC topology of said products/designs having one and three instantiations of sub-NoC E respectively.

The elaboration process utilizes the hierarchical topology represented in the directed acyclic graph 300E, and connectivity definitions of each of the sub-NoCs. The connectivity definitions of each sub-NoC may correspond to mapping information and protocol information. Each top-level design/designs corresponding to the root node may have a unique set of mappings. In some embodiments, the mappings may correspond to paths for routing data packets between various sub-NoC (through the NoC components thereof) of the top-level design/designs associated with the root node. In some examples, the mappings of paths through NoC components corresponds to traffic flows specified in traffic specifications. For example, the mappings of Px.a (whose topology is shown in FIG. 3B) may include paths for traffic flow between a first component associated with sub-NoC A and a second component associated with sub-NoC B (the topologies of which are shown in FIG. 3C). The mappings may include information on the ports used for ingressing and/or egressing the messages through links between the routers.

For example, the mapping may include a path from A.B1 to B.B1, where the sign before the decimal corresponds to an identifier for the sub-NoC and the sign after the decimal corresponds to an identifier for an instantiation of a NoC component (i.e. from bridge B1 of sub-NoC A to bridge B1 of sub-NoC B). In some implementations, an example path may be represented as: A.B1/ar (i.e. transmitting read request from A.B1), A.R1/B1 (i.e. receiving request at router R1 from port for bridge B1), A.R1/S (transmitting request from south port of router R1), A.R3/N, B.R1/N, B.R1/B1, and B.B1/ar (i/e/receiving the message at the second component, B.B1), as shown in representation 300F of FIG. 3F. Other paths may also be used for transporting messages from A.B1 to B.B1. Similarly, the mappings may include paths between each source and destination components associated with all sub-NoCs of the top-level design/root nodes. The mappings may be identified using processes/techniques known those skilled in the art.

The protocol information may indicate the protocols used (such as any one of Advanced eXtensible Interface (AXI), Coherent Hub Interface (CHI), and the like) by the routers/bridges at the boundary of said sub-NoCs. For example, each of the mappings/paths may be defined by channels which are used to send different types of messages/packets, such as read request or read responses within the NoC. The channels may be defined by the protocol implemented by the sub-NoCs. For example, if the read request starts from bridge 1 of the sub-NoC A through a specific channel and proceeds through router 1 in the sub-NoC A to a designated port on the same router, and so on, through a structured path across the NoC. Each step in this path may be marked by a bridge or router identifier and channel notation for sending the data packets from a prior component to a next component. In an embodiment, during the mapping process, the channels may define the types of communication that can occur. Each channel may be configured to a specific protocol, which provides the structure of the data packets transmitted across the NoC. The detailed path from one NoC component to another, down to the individual channels and virtual channels, forms a blueprint for data flow within the network, ensuring efficiency and accuracy in data packet routing.

Figure 3F:
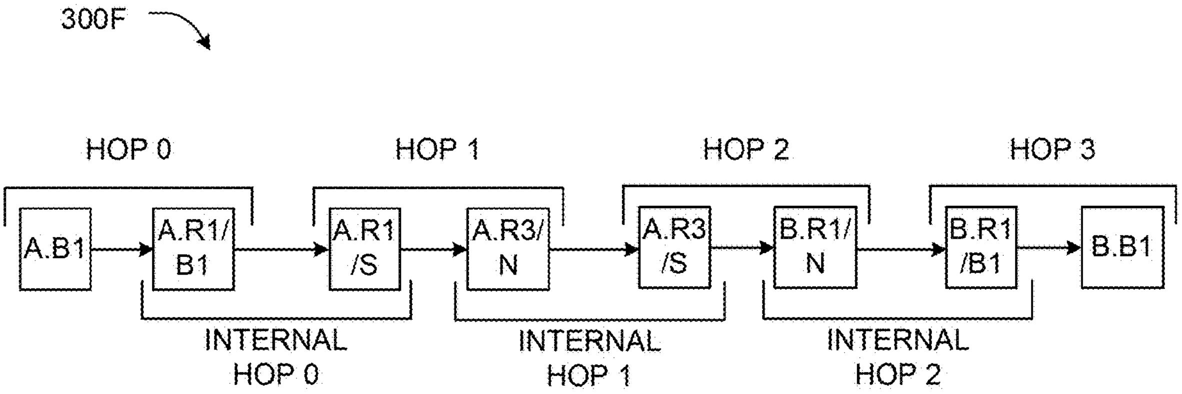
FIG. 3F illustrates a schematic representation of a path structure between a first component and a second component, in accordance with an example implementation.

As stated, each path may include multiple hops (i.e. from moving from one NoC component to another), and one or more internal hops (i.e. from an ingress port to an egress port of a NoC component). FIG. 3F illustrates a schematic representation 300F of a path between the first component and the second component, in accordance with an example implementation. As shown, the path structure between the first and the second component includes four hops, viz. hop 0 being from A.B1 to A.R1, hop 1 being from A.R1 to A.R3, hop 2 being from A.R3 to B.R1, and hop 3 being from B.R1 to B.B1. Further, the path structure may indicate three internal hops (i.e. hops within the NoC components/routers), viz. internal hop 0 from bridge port to south port of A.R1, internal hop 1 from north port to south port of A.R3, and internal hop 2 from north port to bridge port of B.R1. The internal hops may indicate information on internal designs, such as those of the NoC components/routers. While the internal hops are defined with respect to ports, the internal hops may also indicate the virtual channels to be utilized for receiving and transmitting packets to different directions. The internal hops may represent the internal multiplexing circuits/arbitration circuits that receive and direct the messages to appropriate ports.

On determining the internal hops based on the mappings, the internal designs of the NoC components of the sub-NoC associated with the path may be modified. Such NoC components may be configured to allow the packets to ingress and egress from the NoC components through appropriate ports. In some examples, the elaboration process may extend the NoC design to accommodate a variety of packet sizes and communication protocols. For instance, within the routers, a multitude of connections between inputs and outputs may be established. Additionally, an assessment of packet size may inform the determination of channel widths. The structure and type of packets being transmitted may also be determined based on the protocol. This aspect of the design may consider the initial and final sizes of the packets, taking into account possible width conversions that may be required as data traverses the network. the NoC components may be accordingly configured to handle packets of different sizes. Based on the information on ingress and egress of packets and the size and structure of packets, register transfer level (RTL) definitions may be formulated for the NoC components, which may be copied into the sub-NoC designs.

The elaboration process may further include checking for incompatibility between the mappings and the hierarchy of the sub-NoCs. The elaborated NoC components of each sub-NoC may be compared with corresponding elaborated NoC components of adjacent sub-NoCs to check for compatibility. If the mappings are incompatible with the hierarchical topology, then new/different mappings are used for elaboration.

In some embodiments, the elaboration process may not be establishing connections but identifying and modifying the correct components within the hierarchy. For example, when accessing a specific bridge within the sub-NoCs, it is essential to recognize that both paths lead to the same underlying bridge design. The elaboration may configure routers and also configure the bridges that mark the beginning and end of data hops. In some embodiments, the importance of the protocol may become evident in its impact on the mapping process, particularly in its capacity to prevent deadlocks, thereby ensuring a reliable flow of data within the NoC.

The elaboration process may yield the interconnect design for implementing the sub-NoCs on silicon chips/dies. Using multiple instantiations of sub-NoCs having a hierarchical relationship, and elaborating the sub-NoCs to develop the interconnect design may subsequently reduce the time and effort/overheads required to perform chip back-end processes/physical design processes, such as timing closure, verification and validation, and the like. For example, any optimizations with respect to placement, clock-tree synthesis, logic, and the like, made for achieving timing closure in a sub-NoC design can be directly applied/implemented in all instantiations of said sub-NoC, thereby reducing time and computational resources required for timing closure. Further, multi-instancing may reduce the (computations) complexity and expenditure of analyses performed during back-end processes due to elimination of redundant computations.

Figure 4A:
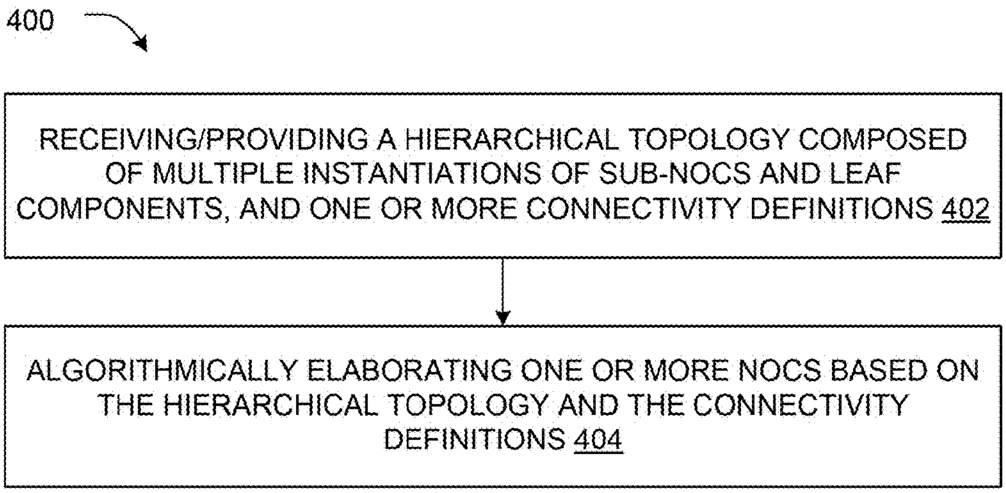
FIG. 4A illustrates a flowchart of a method for constructing NoCs through a hierarchical topology, in accordance with an example implementation.

FIG. 4A illustrates a flowchart of a method 400 for constructing NoCs through a hierarchical topology, in accordance with an example implementation.

Referring to FIG. 4A, at block 402, the method 400 may include receiving/providing a hierarchical topology composed of multiple instantiations of sub-NoCs and leaf components, and one or more connectivity definitions. In an embodiment, the hierarchical topology may include a plurality of root nodes in a hierarchical-directed acyclic graph. The sub-NoCs and leaf components may be pre-elaborated.

Figure 4B:
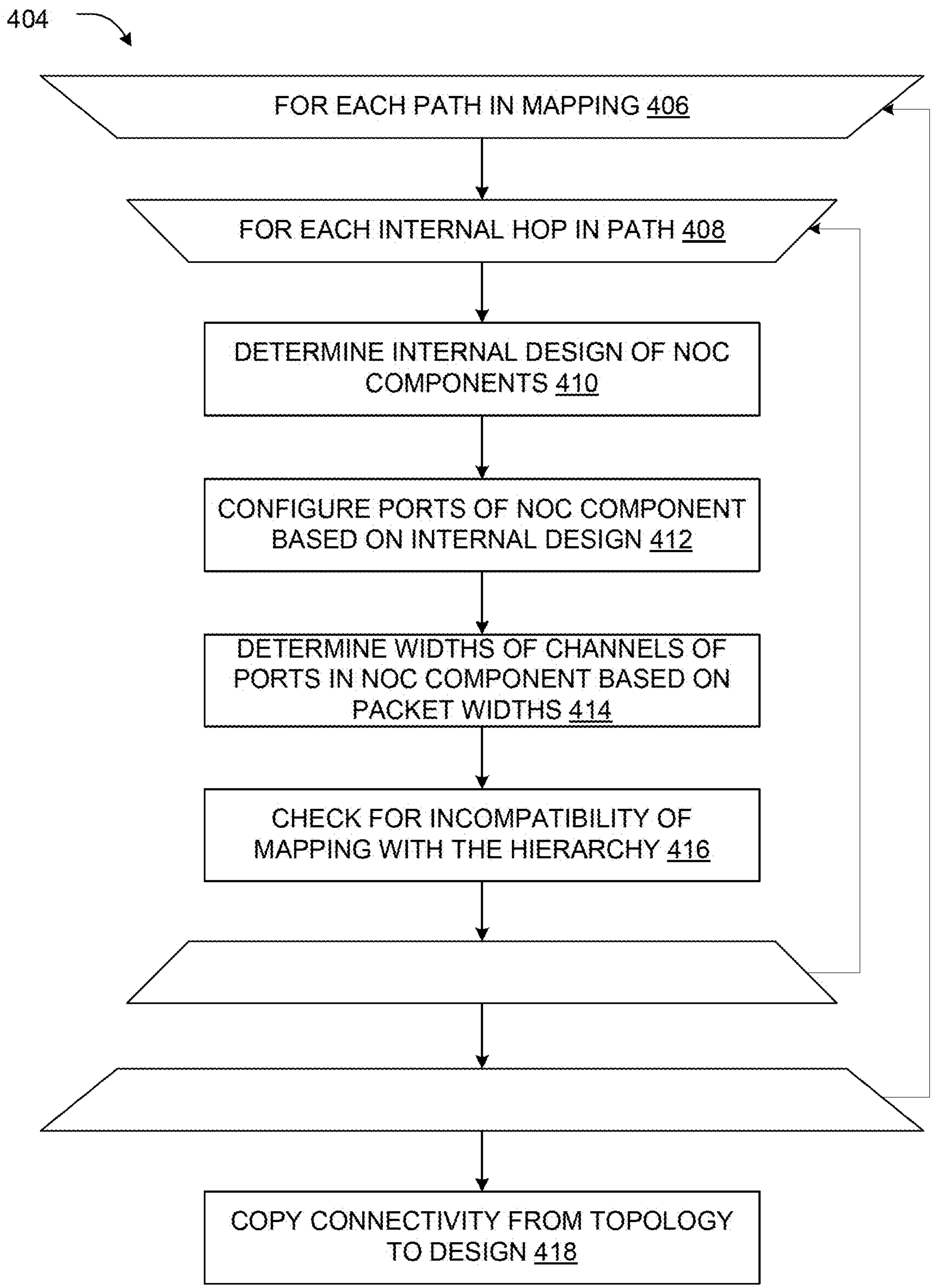
FIG. 4B illustrates a flowchart for elaborating sub-NoCs and/or leaf components, in accordance with an example implementation.

At block 404, the method 400 may include algorithmically elaborating one or more NoCs based on the hierarchical topology and the connectivity definitions. For elaborating the sub-NoCs and/or leaf components at step 404, the method 400 may include further sub-steps as shown in FIG. 4B. In some embodiments, the step 404 may be iterated for every root node in the hierarchical topology.

At blocks 406 and 408, the method 400 may include iterating over each path in the mappings, and each internal hop in each path, respectively. At each iteration, blocks 410 to 416 may be implemented/executed. At block 410, the method 400 includes determining internal designs of the NoC components, such as of routers in the sub-NoC designs. The internal designs may be determined by retrieving the ports required for routers/NOC components to allow ingress and egress of packets/messages in one or more directions. The determination at block 410 may be made based on the hierarchical topology (i.e. relation of each sub-NoC to another), and the mappings.

At block 412, the method 400 includes configuring/determining the NoC components to implement the internal design, for example, by adding/configuring multiplexing circuits to move packets from the ingress ports to appropriate egress ports of the NoC component.

The internal designs may also indicate the width of the packets being transported at each hop/internal hop. The packet widths may be provided in the protocol information associated with each sub-NoC. At block 414, the method 400 includes determine widths of the packets being transported through each channel of each port of the NoC components associated with the paths. The results of blocks 412 and 414 may allow register transfer level (RTL) descriptions to be formulated for the NoC components of the sub-NoCs.

At block 416, the method 400 may include checking for (in) compatibility between the mappings and the hierarchy of the sub-NoCs. Checking for compatibility may ensure that the NoC is functional (i.e. allows communication between and within sub-NoCs) when eventually constructed. The elaborated NoC components of each sub-NoC may be compared with boundary ports (i.e. corresponding elaborated NoC components) of adjacent sub-NoCs to check for compatibility. If the mappings are incompatible with the hierarchical topology, then either new/different mappings are used for elaboration. In such instances, the method 400 may either terminate or return to block 406. If the mappings are compatible with the hierarchical topology of the sub-NoCs, a copy of the connections of the topology of design is made. The connectivity definitions may be duplicated for every channel (being virtual or physical) associated with the NoC component. The output/result of the elaboration process may be an interconnect design, which can be used for fabrication.

In an embodiment, the method 400 may include combining traffic specifications associated with the NoCs with the hierarchical topology to algorithmically elaborate the sub-NoCs or the leaf components according to the hierarchical topology. In an embodiment, the method 400 may include determining/mapping a path for each flow in the traffic specification and for each path, configuring each component or wire in each path to carry a type of packet for the flow from a prior component of the path to the next component in the path. In an embodiment, at least one boundary port comprises virtual channel information. In an embodiment, traffic flows of the traffic specifications may include information defining whether virtual channels or physical channels of the NoCs can be shared or not shared with other ones of the traffic flows.

Figure 5:
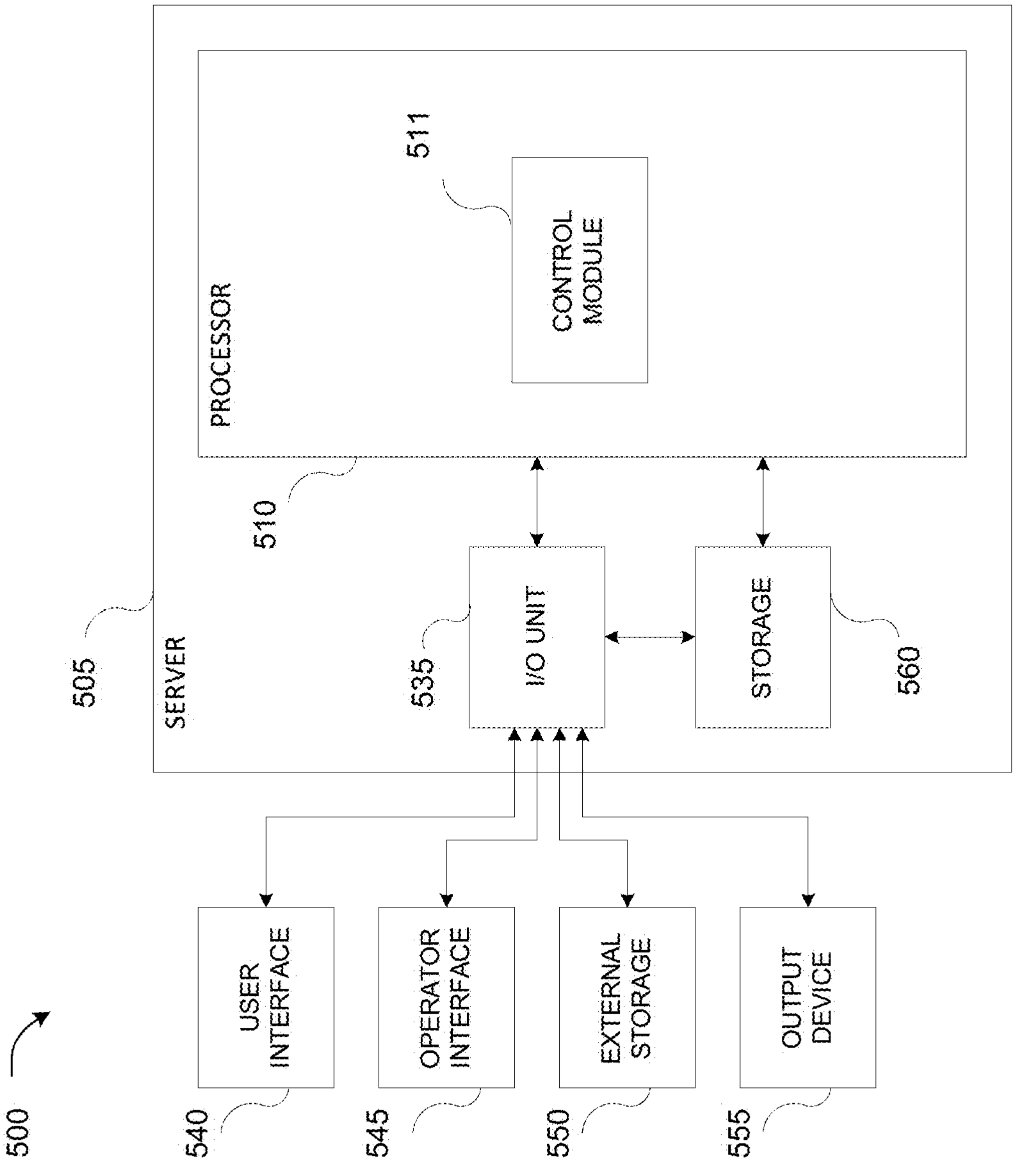
FIG. 5 illustrates a computer/server block diagram upon which the example implementations described herein may be implemented.

The method 400 and the apparatus of the present disclosure may be implemented in a computer system. FIG. 5 illustrates an example computer system 500 on which example embodiments may be implemented. The computer system 500 includes a server 505 which may include an I/O unit 535, storage 560, and a processor 510 operable to execute one or more units as known to one of skill in the art. The term "computer-readable medium" as used herein refers to any medium that participates in providing instructions to processor 510 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The Input/Output (I/O) unit 535 processes input from user interfaces 540 and operator interfaces 545 which may utilize input devices such as a keyboard, mouse, touch device, or verbal command.

The server 505 may also be connected to an external storage 550, which can contain removable storage such as a portable hard drive, optical media (CD or DVD), disk media, or any other medium from which a computer can read executable code. The server may also be connected to an output device 555, such as a display to output data and other information to a user, as well as request additional information from a user. The connections from the server 505 to the user interface 540, the operator interface 545, the external storage 550, and the output device 555 may be via wireless protocols, such as the 802.11 standards, Bluetooth® or cellular protocols, or via physical transmission media, such as cables or fiber optics. The output device 555 may therefore further act as an input device for interacting with a user.

The processor 510 may include a control module 511 that is configured to implement the method 400 for constructing NoCs, among other functions.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A method, comprising:

algorithmically elaborating one or more of Network on Chips (NoCs) designs defined using a hardware description language (HDL) through input of a multi-level hierarchical topology composed of instantiations of sub-NoCs and leaf components, and one or more connectivity definitions;

wherein the algorithmically elaborating the sub-NoCs and the leaf components comprises combining the hierarchical topology with traffic specifications associated with the NoCs;

wherein the combining the hierarchical topology with the traffic specifications comprises:

determining a path for each flow in the traffic specifications; and for each internal hop of the path associated with a NoC component, input ports of the NoC component, and output ports of the NoC component:

determining an internal design for the NoC component;

configuring the internal design to have connectivity between the input ports and corresponding ones of the output ports; and configuring widths of the input ports and the corresponding output ports to carry a type of packet for the each flow from a prior component of the path to a next component in the path.

2. The method of claim 1, wherein the hierarchical topology comprises a plurality of root nodes.

3. The method of claim 1, wherein the sub-NoCs and the leaf components are pre-elaborated.

4. The method of claim 1, wherein the path of the packet through each of the sub-NoCs comprises virtual channel information.

5. The method of claim 1, wherein traffic flows of the traffic specifications comprise information defining whether virtual channels or physical channels of the NoCs can be shared or not shared with other ones of the traffic flows.

6. A non-transitory computer-readable storage medium storing instructions for executing a process, comprising:

algorithmically elaborating one or more of Network on Chips (NoCs) designs defined using a hardware description language (HDL) through an input of a multi-level hierarchical topology composed of instantiations of sub-NoCs and leaf components, and one or more connectivity definitions;

wherein the algorithmically elaborating the sub-NoCs and the leaf components comprises combining the hierarchical topology with traffic specifications associated with the NoCs;

wherein the combining the hierarchical topology with the traffic specifications comprises:

determining a path for each flow in the traffic specifications; and for each internal hop of the path associated with a NoC component, input ports of the NoC component, and output ports of the NoC component:

determining an internal design for the NoC component;

configuring the internal design to have connectivity between the input ports and corresponding ones of the output ports; and configuring widths of the input ports and the corresponding output ports to carry a type of packet for the each flow from a prior component of the path to a next component in the path.

7. The non-transitory computer-readable storage medium of claim 6, wherein the hierarchical topology comprises a plurality of root nodes.

8. The non-transitory computer-readable storage medium of claim 6, wherein the sub-NoCs and the leaf components are pre-elaborated.

9. The non-transitory computer-readable storage medium of claim 6, wherein the path of the packet through each of the sub-NoCs comprises virtual channel information.

10. The non-transitory computer-readable storage medium of claim 8, wherein traffic flows of the traffic specifications comprise information defining whether virtual channels or physical channels of the NoCs can be shared or not shared with other ones of the traffic flows.

11. An apparatus, comprising a processor configured to:

algorithmically elaborate one or more of Network on Chips (NoCs) designs defined using a hardware description language (HDL) through an input of a multi-level hierarchical topology composed of instantiations of sub-NoCs and leaf components, and one or more connectivity definitions;

wherein to algorithmically elaborate the sub-NoCs or the leaf components according to the hierarchical topology, the processor is configured to combine the hierarchical topology with traffic specifications associated with the NoCs;

wherein to combine the hierarchical topology with the traffic specifications, the processor is configured to:

determine a path for each flow in the traffic specifications; and for each internal hop of the path associated with a NoC component, input ports of the NoC component, and output ports of the NoC component:

determining an internal design for the NoC component;

configure the internal design to have connectivity between the input ports and corresponding ones of the output ports; and configure widths of the input ports and the corresponding output ports to carry a type of packet for the each flow from a prior component of the path to a next component in the path.

12. The apparatus of claim 11, wherein the hierarchical topology comprises a plurality of root nodes.

13. The apparatus of claim 11, wherein the sub-NoCs and the leaf components are pre-elaborated.

14. The apparatus of claim 11, wherein the path of the packet through each of the sub-NoCs comprises virtual channel information.

15. The apparatus of claim 11, wherein traffic flows of the traffic specifications comprise information defining whether virtual channels or physical channels of the NoCs can be shared or not shared with other ones of the traffic flows.

* * * * *